(12) United States Patent
Kawasaki (10) Patent No.: US 7,507,031 B2
(45) Date of Patent: Mar. 24, 2009

(54) OPTICAL CONNECTOR COMPONENT AND OPTICAL CONNECTOR USING THE SAME

(75) Inventor: Yasunari Kawasaki, Chiba (JP)

(73) Assignee: Seikoh Giken Co., Ltd., Chiga (JP)

( * ) Notice: Subject to any disclaimer, the term of this patent is extended or adjusted under 35 U.S.C. 154(b) by 13 days.

(21) Appl. No.: 11/834,124

(22) Filed: Aug. 6, 2007

(65) Prior Publication Data

US 2008/0095504 A1 Apr. 24, 2008

(30) Foreign Application Priority Data

Aug. 7, 2006 (JP) .............................. 2006-214902
Jul. 31, 2007 (JP) .............................. 2007-199340

(51) Int. Cl.
*G02B 6/36* (2006.01)

(52) U.S. Cl. .............................. 385/72; 385/78; 385/84; 385/60; 385/68

(58) Field of Classification Search ........................ None
See application file for complete search history.

(56) References Cited

U.S. PATENT DOCUMENTS 6,481,903 B1 * 11/2002 Varma et al. ................... 385/99
2005/0220424 A1 * 10/2005 Asano et al. ................... 385/78
2005/0244108 A1 * 11/2005 Billman et al. ................. 385/60
2006/0269192 A1 * 11/2006 Hayasaka ...................... 385/60

* cited by examiner

*Primary Examiner*—Uyen Chau N Le
*Assistant Examiner*—Mike Stahl
(74) *Attorney, Agent, or Firm*—Carlson, Gaskey & Olds (57) ABSTRACT

To provide a fusion-spliced optical connector capable of easily performing a fusion-splicing operation at an actual site in a short time, without need to perform additional special operations. An optical connector component is configured to attach a short-length optical fiber to a ferrule including a capillary and a flange. The capillary comprises a minute through hole and a coated-portion storage hole formed in the capillary, the minute through hole to be stored therein the bare optical fiber portion of the short-length optical fiber and the coated-portion storage hole to be stored therein a part of a coated optical fiber portion of the short-length optical fiber continuous to the bare optical fiber portion. The flange includes a coated-portion penetrating hole formed in the flange to be penetrated therein a very short portion continuous to the part of the coated optical fiber portion stored in the coated-portion storage hole. The short-length optical fiber extends rearward from the coated-portion penetrating hole of the flange by a length of a required extra-length splice portion when the bare optical fiber portion is fixedly stored in the minute through hole of the capillary and the part of the coated optical fiber portion continuous to the bare optical fiber portion is fixedly stored in the coated-portion storage hole of the capillary.

19 Claims, 6 Drawing Sheets

Proof Testing (Telcordia GR-326-CORE Section 4.4.3.4)

| Test condition | Connector length | | | | |
|---|---|---|---|---|---|
| | 69mm | 80mm | 85mm | 90mm | 95mm |
| 4.5kgf at 0° | 5/5 | 5/5 | 5/5 | 5/5 | 5/5 |
| 6.8kgf at 0° | 5/5 | 5/5 | 5/5 | 5/5 | 5/5 |
| 2.3kgf at 90° | 5/5 | 5/5 | 5/5 | 5/5 | 5/5 |
| 3.4kgf at 90° | 5/5 | 5/5 | 5/5 | 5/5 | 0/5 |

Test result : Passed/All Samples

FIG. 8B

Transmission with Applied Tensile Load
(Telcordia GR-326-CORE Section 4.4.3.5)
Angle 90°, Tensile strength : 0.25kgf→0.7kgf→1.5kgf→2.0kgf

| Tensile strength | Connector length | | | | |
|---|---|---|---|---|---|
| | 69mm | 80mm | 85mm | 90mm | 95mm |
| 0.25kgf | 5/5 | 5/5 | 5/5 | 5/5 | 5/5 |
| 0.7kgf | 5/5 | 5/5 | 5/5 | 5/5 | 5/5 |
| 1.5kgf | 5/5 | 5/5 | 5/5 | 5/5 | 5/5 |
| 2.0kgf | 5/5 | 2/5 | 3/5 | 1/5 | 2/5 |

Test result : Passed/All Samples

FIG. 8C

Connector Installation (Telcordia GR-326-CORE Section 4.4.6)

| | Connector length | | | | |
|---|---|---|---|---|---|
| | 69mm | 80mm | 85mm | 90mm | 95mm |
| Test result | 5/5 | 5/5 | 5/5 | 5/5 | 1/5 |

Test result : Passed/All Samples

OPTICAL CONNECTOR COMPONENT AND OPTICAL CONNECTOR USING THE SAME

RELATED APPLICATIONS

This application is based upon and claims the benefit of priority from the prior Japanese Patent Application No. 2006-214902, filed on Aug. 7, 2006 and Japanese Patent Application No. 2007-199340, filed on Jul. 31, 2007; the entire contents of which are incorporated herein by reference.

BACKGROUND OF THE INVENTION

1. Field of the Invention

The present invention relates to an optical connector component and an optical connector using the optical connector component in which a short-length optical fiber is attached to a ferrule in advance and which facilitates an operation for attaching an optical connector to a tip end of an optical fiber at an actual site.

2. Description of the Related Art

In recent years, there have been demands for attaching an optical connector to a tip end of an optical fiber at an actual site, the operability of which site is restricted as compared with manufacturing facilities, so as to realize construction of an optical fiber-based access network, in-house optical interconnects or the like.

Conventionally, as a simple built-up optical connector to meet the demands, there is known an optical connector configured such that a short-length optical fiber is attached to a ferrule and then the end-process is performed in advance and such optical-fiber-attached ferrule is spliced, i.e., spliced to an another optical fiber by mechanical splicing at an actual site. There is also known an optical connector configured such that a similar optical-fiber-attached ferrule to that described above is fusion-spliced to an another optical fiber at an actual site and such that a fusion-spliced portion is stored in a housing.

However, the mechanically-spliced optical connector has disadvantages in that a manufacturing process for including the short-length optical fiber in the optical connector is complicated and cost increases. Furthermore, because of presence of optical connectors of many types different in the shape of the housing, it is necessary to prepare accurate mechanical splice members of shapes corresponding to the respective optical connectors, disadvantageously resulting in cost increase.

Furthermore, while the conventional fusion-spliced optical connector is superior to the mechanically-spliced optical connector in reliability of the spliced portion, it is required for the fusion-spliced optical connector to make the fusion-spliced portion shorter to store the fusion-spliced portion in the housing. For example, Patent Document 1 discloses a special reinforcement plate to serve as a reinforcement member that reinforces the fusion-spliced portion.

Meanwhile, it is required to perform many optical splicing operations in a short time to realize the construction of the optical-fiber-based access network, the in-house optical wirings or the like. Due to this, it is undesirable to increase such special operations to be performed at the actual site.

SUMMARY OF THE INVENTION

The present invention has been achieved in view of the above circumstances, and an object of the present invention is to provide an optical connector component capable of easily performing a fusion-splicing operation on a fusion-spliced optical connector at an actual site in a short time, without need to perform additional special operations, and to provide an optical connector using the optical connector component.

According to one aspect of the present invention, there is provided an optical connector component comprising: a ferrule including a capillary and a flange holding a rear end of the capillary; and a short-length optical fiber, attached to the ferrule, having a bare optical fiber portion formed on a tip end of the short-length optical fiber and a splice portion formed on a rear end of the short-length optical fiber to be fusion-spliced to a tip end of an optical fiber, any coating around the bare optical fiber portion being removed, wherein the capillary comprises a minute through hole and a coated-portion storage hole formed from a tip end to the rear end in the capillary, the minute through hole storing therein the bare optical fiber portion of the short-length optical fiber and the coated-portion storage hole storing therein a part of a coated optical fiber portion of the short-length optical fiber continuous to the bare optical fiber portion, the flange including an end wall immediately adjacent to the rear end of the capillary and having no extension extending rearward from the end wall, a peripheral wall extending from the end wall and circumferentially around the rear end of the capillary, and a coated-portion penetrating hole formed in the end wall to be penetrated therein a very short portion continuous to the part of the coated optical fiber portion stored in the coated-portion storage hole, and the short-length optical fiber extending rearward from the coated-portion penetrating hole of the flange and becoming exposed by an extra length required for the splice portion when the bare optical fiber portion is fixedly stored in the minute through hole of the capillary and the part of the coated optical fiber portion continuous to the bare optical fiber portion is fixedly stored in the coated-portion storage hole of the capillary.

According to another aspect of the present invention, the minute through hole and the coated-portion storage hole are formed in the capillary so that the minute through hole is shorter than the coated-portion storage hole.

According to another aspect of the present invention, the extra-length splice portion extending rearward from the flange has at least a length required by a splicing device splicing a rear end of the extra-length splice portion to a tip end of an optical fiber to which the rear end of the extra-length splice portion is optically spliced.

According to another aspect of the present invention, an outside diameter of the capillary is approximately 2.5 mm, and an entire optical-axis-direction length of the ferrule including the capillary and the flange is not longer than 12 mm.

According to another aspect of the present invention, an optical-axis-direction length of the minute through hole of the capillary is not shorter than 2 mm and not longer than 5 mm.

According to another aspect of the present invention, an optical-axis-direction length of the flange is not shorter than 3 mm and not longer than 4 mm.

According to another aspect of the present invention, there is provided an optical connector comprising: an optical fiber having an optical connector component attached to a tip end of the optical fiber, and a plug housing storing and holding the optical connector component therein; the optical connector component including: a ferrule including a capillary and a flange holding a rear end of the capillary; and a short-length optical fiber, attached to the ferrule, having a bare optical fiber portion formed on a tip end of the short-length optical fiber and a splice portion formed on a rear end of the short-length optical fiber to be fusion-spliced to a tip end of the optical fiber, any coating around the bare optical fiber portion being removed, the capillary comprises a minute through hole and a coated-portion storage hole formed from a tip end to the rear end in the capillary in order, the minute through hole storing therein the bare optical fiber portion of the short-length optical fiber and the coated-portion storage hole storing therein a part of a coated optical fiber portion of the short-length optical fiber continuous to the bare optical fiber portion, the flange including an end wall immediately adjacent to the rear end of the capillary and having no extension extending rearward from the end wall, peripheral wall extending from the end wall and circumferentially around the rear end of the capillary, and a coated-portion penetrating hole formed in the end wall and to be penetrated therein a very short portion continuous to the part of the coated optical fiber portion stored in the coated-portion storage hole, and the short-length optical fiber extends rearward from the coated-portion penetrating hole of the flange and becomes exposed by an extra length required for the splice portion when the bare optical fiber portion is fixedly stored in the minute through hole of the capillary and the part of the coated optical fiber portion continuous to the bare optical fiber portion is fixedly stored in the coated-portion storage hole of the capillary, and a fusion-spliced portion formed by fusion-splicing the splice portion of the short-length optical fiber to the tip end of the optical fiber, the fusion-spliced portion stored and held in a plug housing while a reinforcing member reinforces the fusion-spliced portion.

According to another aspect of the present invention, the reinforcing member is a heat-shrinkable sleeve containing a metal and a thermoplastic resin and having an optical-axis-direction length not longer than 25 mm.

According to another aspect of the present invention, the fusion splicing is performed after arranging that the rear end of the short-length optical fiber and the tip end of the optical fiber are opposed and aligned by referring to a position of cores or cladding portions.

According to another aspect of the present invention, an entire length of the optical connector from a tip end of the ferrule to a rear end of a boot is not longer than 90 mm.

According to another aspect of the present invention, an entire length of the optical connector from a tip end of the ferrule to a rear end of a boot is not longer than 70 mm.

These and other features of the present invention can be best understood from the following specification and drawings, the following of which is a brief description.

DETAILED DESCRIPTION OF THE PREFERRED EMBODIMENT

Figure 1:
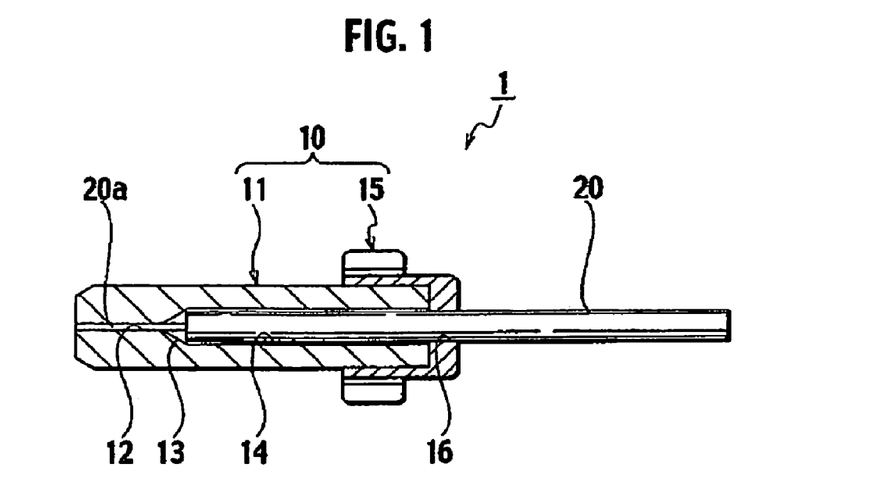
FIG. 1 is a cross-sectional view showing an embodiment of an optical connector component according to the present invention.
Figure 2:
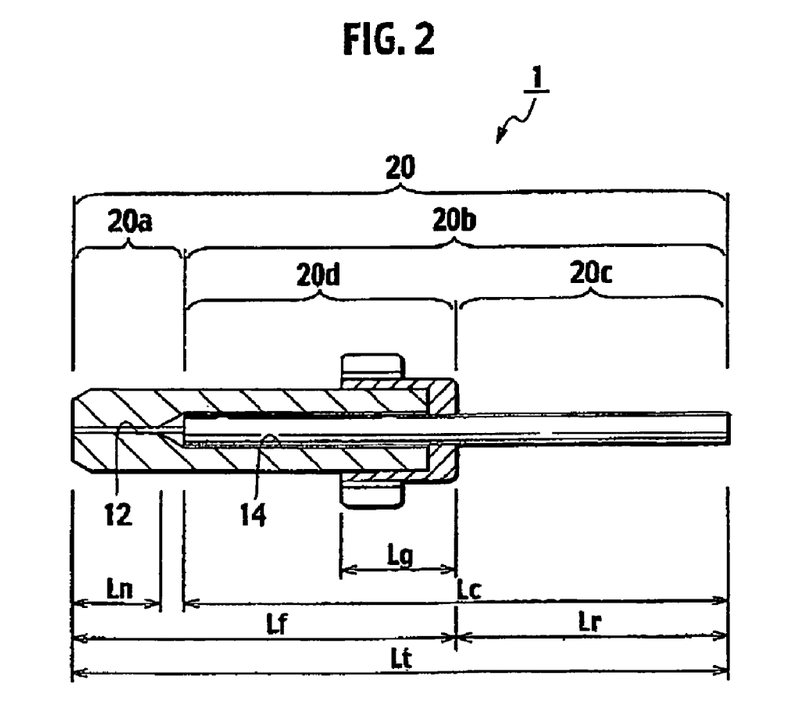
FIG. 2 is a cross-sectional view showing a length of each of constituent elements of the optical connector component shown in FIG. 1.

FIGS. 1 and 2 are cross-sectional views showing an embodiment of an optical connector component according to the present invention. An optical connector component 1 is configured such that a short-length optical fiber 20 is attached to a ferrule 10. The ferrule 10 includes a capillary 11 and a flange 15 that holds a rear end of the capillary 11. The short-length optical fiber 20 includes a bare optical fiber portion 20a formed on its tip end, which any coating around the bare optical fiber portion 20a being removed.

A minute through hole 12 is formed in the capillary 11 to be stored therein the bare optical fiber portion 20a of the short-length optical fiber 20. A coated-portion storage hole 14 is also formed in the capillary 11 to be stored therein a part of a coated optical fiber portion 20b (see FIG. 2) continuous to the bare optical fiber portion 20a. The minute through hole 12 and the coated-portion storage hole 14 are formed in this order from a tip end (a left end in FIG. 1) to a rear end (a right end in FIG. 1) of the capillary 11. A tapered portion 13 is formed in a boundary portion between the minute through hole 12 and the coated-portion storage hole 14 of the capillary 11 to spread from the minute through hole 12 toward the coated-portion storage hole 14.

A coated-portion penetrating hole 16 is formed in the flange 15 to be penetrated a very short portion continuous to the part of the coated optical fiber portion 20b stored in the coated-portion storage hole 14.

As shown in FIG. 2, the short-length optical fiber 20 extends rearward from the coated-portion penetrating hole 16 of the flange 15 by a length of a required extra-length splice portion 20c when the bared optical fiber portion 20a is fixedly stored in the minute through hole 12 of the capillary 11 and the part of the coated optical fiber portion 20b continuous to the bared optical fiber portion 20a is fixedly stored in the coated-portion storage hole 14.

The minute through hole 12 and the coated-portion storage hole 14 of the capillary 11 are formed such that the minute through hole 12 is shorter than the coated-portion storage hole 14.

A length Lr of the extra-length splice portion 20c extending rearward from the flange 15 is at least a length required by a splicing device (not shown) splicing a rear end of the extra-length splice portion 20c to a tip end of an optical fiber 60 (see FIGS. 3 and 4) to which the rear end of the extra-length splice portion 20c is optically spliced.

An outside diameter of the capillary 11 is approximately 2.5 mm, and an entire optical-axis-direction length Lf of the ferrule 10 including the capillary 11 and the flange 15 is not longer than 12 mm.

An optical-axis-direction length Ln of the minute through hole 12 of the capillary 11 is not shorter than 2 mm to secure splice strength of the bare optical fiber portion 20a. Although the optical-axis-direction length Ln of the minute through hole 12 is preferably shorter to downsize the optical connector component 1 and an optical connector 50, to be described later, it suffices that the length Ln is not longer than 5 mm to realize the optical connector component 1 and the optical connector 50 according to the present invention.

An optical-axis-direction length Lg of the flange 15 is not shorter than 3 mm to secure a holding strength of the capillary 11. Although the optical-axis-direction length Lg of the flange 15 is preferably shorter to downsize the optical connector component 1 and the optical connector 50, to be described later, it suffices that the length Lg is not longer than 4 mm to realize the optical connector component 1 and the optical connector 50 according to the present invention.

The short-length optical fiber 20 of the optical connector component 1 is fixedly stored into the ferrule 10 while an appropriate optical fiber is cut to have a predetermined length at manufacturing facilities or the like in advance. The tip end of the short-length optical fiber 20 as well as the tip end of the ferrule 10 is subjected to an end polishing process in advance so as to prevent insertion loss from occurring between the short-length optical fiber 20 and the connection-destination optical connector.

It is necessary to perform a coating removal process and an end process on the extra-length splice portion 20c extending rearward from the ferrule 10 to perform the fusion splicing during assembly of the optical connector 50 to be described later. These processes can be performed in advance at the manufacturing facilities or the like. It is thereby possible to dispense with an operation for the processes at the actual site.

Nevertheless, the coating removal process and the end process necessary for fusion-splicing of an optical fiber 60 assembled into the optical connector 50 at the actual site are performed at the actual site. Therefore, it is preferable to perform an end process on the extra-length splice portion 20c extending rearward from the ferrule 10 together with that on the optical fiber 60 at the actual site.

Figure 3:
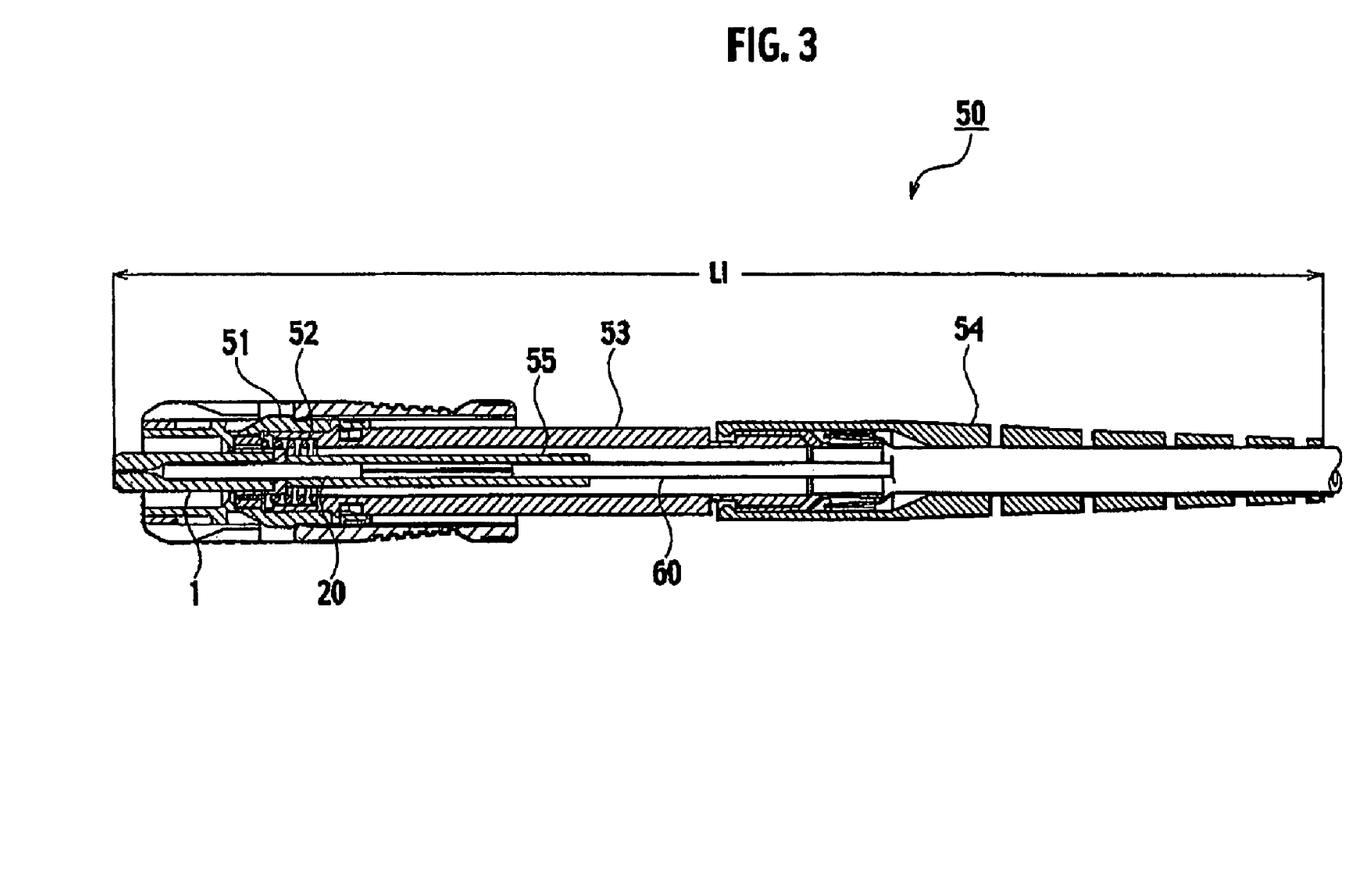
FIG. 3 is a cross-sectional view showing an embodiment of an optical connector using the optical connector component shown in FIGS. 1 and 2 according to the present invention.
Figure 4:
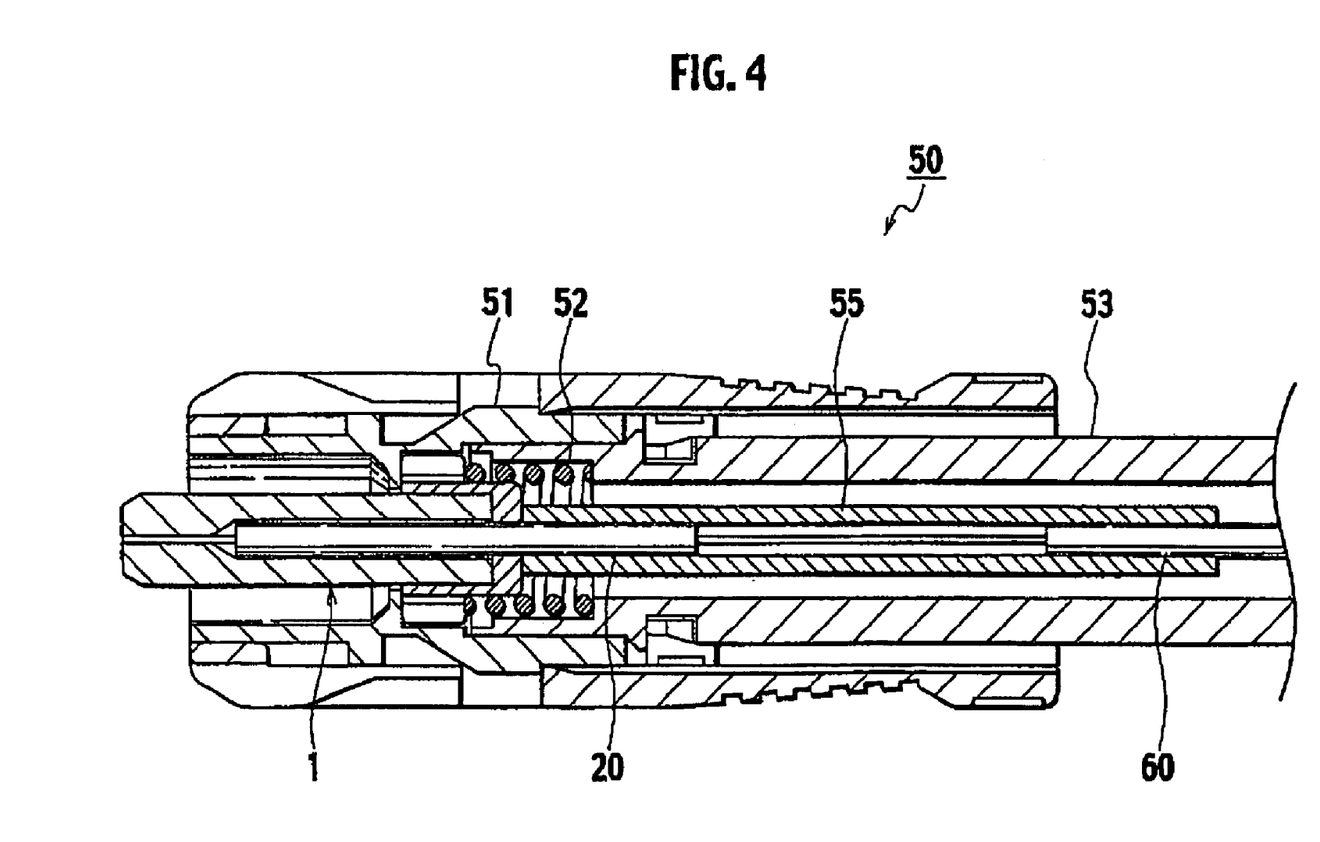
FIG. 4 is an enlarged cross-sectional view of relevant parts of an optical connector shown in FIG. 3.

FIG. 3 is a cross-sectional view of the optical connector 50 using the optical connector component 1 described above. FIG. 4 is an enlarged cross-sectional view of relevant parts of the optical connector 50 shown in FIG. 3. The optical connector 50 includes the optical connector component 1 being stored and held in a plug housing 51 after a rear end of the short-length optical fiber 20 extending rearward of the optical connector component 1 is fusion-spliced to a tip end of the optical fiber 60 and a reinforcing member 55 reinforces a fusion-spliced portion in which the rear end of the short-length optical fiber 20 is fusion-spliced to the tip end of the optical fiber 60.

The optical connector 50 includes a spring 52 and a stop ring 53 formed in the plug housing 51 so as to position the optical connector component 1 and so as to movably store and hold the optical connector component 1 in an axial direction while the tip end of the ferrule 10 protrudes. Reference numeral 54 denotes a boot.

The reinforcing member 55 is a heat-shrinkable sleeve containing a metal and a thermoplastic resin and having an optical-axis-direction length not longer than 25 mm. However, the present invention is not limited to the heat-shrinkable sleeve, and a metal sleeve can be employed as the reinforcing member 55.

A fusion-splicing operation is performed as follows. First of all, a coating of a rear required-length portion of the extra-length splice portion 20c of the short-length optical fiber 20 and a coating of a front required-length portion of the optical fiber 60 are removed. Next, the short-length optical fiber 20 and the optical fiber 60 are arranged such that the rear end of the short-length optical fiber 20 is opposed to the tip end of the optical fiber 60. After aligning the short-length optical fiber 20 and the optical fiber 60 by referring to a position of cores or cladding portions, the short-length optical fiber 20 is fusion-spliced to the optical fiber 60.

Figure 5:
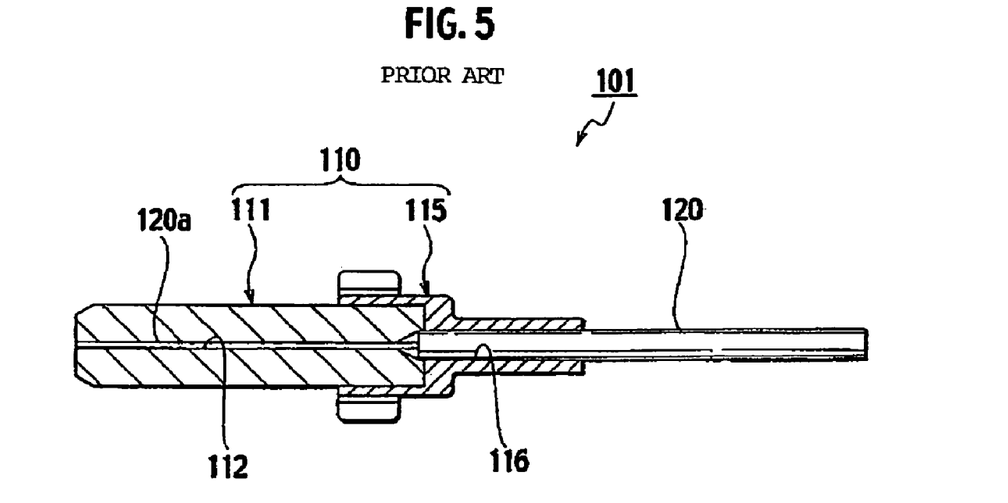
FIG. 5 is a cross-sectional view showing an example of a conventional optical connector component.
Figure 6:
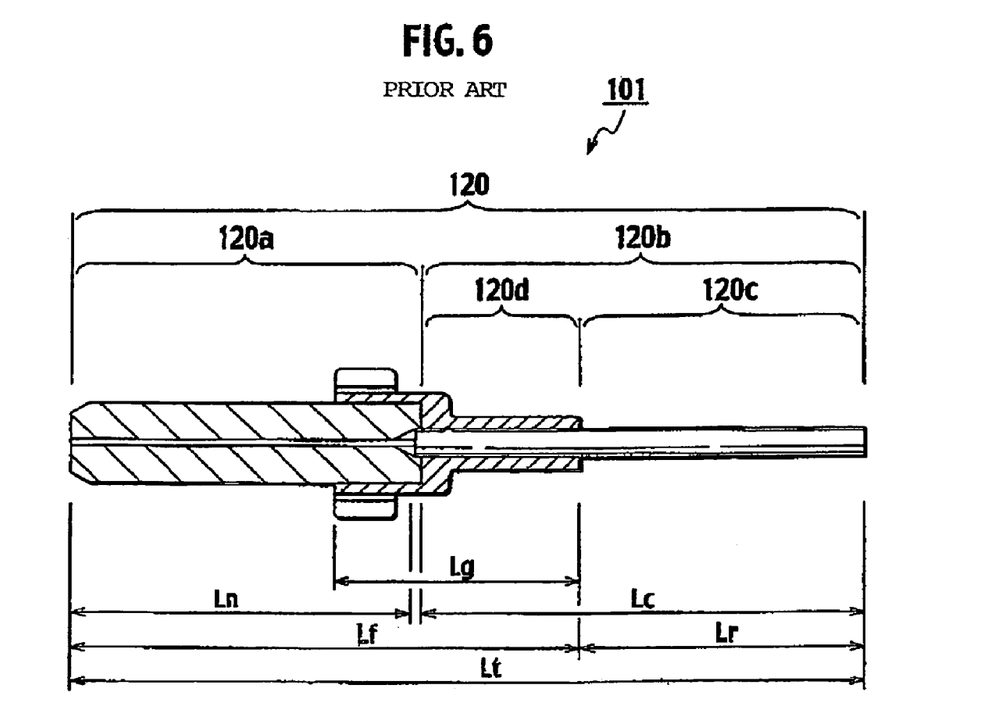
FIG. 6 is a cross-sectional view showing a length of each of constituent elements of the conventional optical connector component shown in FIG. 5.

FIGS. 5 and 6 are cross-sectional views showing an example of a conventional optical connector component 101. Similar constituent elements of the optical connector component 101 to those of the optical connector component 1 are denoted by reference numerals that are 100-added reference numerals used in FIGS. 1 and 2, respectively.

In the conventional optical connector component 101, a minute through hole 12 storing therein a bare optical fiber portion 120a of a short-length optical fiber 120 is formed in a capillary 111. However, a coated-portion storage hole 114 storing therein a part of a coated optical fiber portion 120b (see FIG. 5) continuous to a bare optical fiber portion 120a is not formed in the capillary 111.

Therefore, to store a part of the coated optical fiber portion 120b continuous to the bare optical fiber portion 120a and to secure the holding strength of the coated optical fiber portion 120b, an optical-axis-direction length Lg (see FIG. 6) of a flange 115 is set twice or more, e.g., approximately 2.5 times as long as the optical-axis-direction length Lg (see FIG. 2) of the flange 15 of the optical connector component 1 shown in FIGS. 1 and 2.

Due to this, as evident from comparison of FIG. 2 with FIG. 6, an entire length Lt (see FIG. 6) of the optical connector component 101 is far longer than an entire length Lt (see FIG. 2) of the optical connector component 1 shown in FIGS. 1 and 2.

Conversely, the optical-axis-direction length of the optical connector component 1 according to the present invention is approximately three-fourths of that of the conventional optical connector component 101. As a result, the optical connector component 1 according to the present invention has enough room in optical-axis-direction space. It is thereby possible to fusion-splice the optical connector component 1 to the optical fiber 60 using a relatively large-sized core direct-vision fusion splicer, and to realize low-loss fusion-splicing having a insertion loss of 0.1 dB or less.

Figure 7:
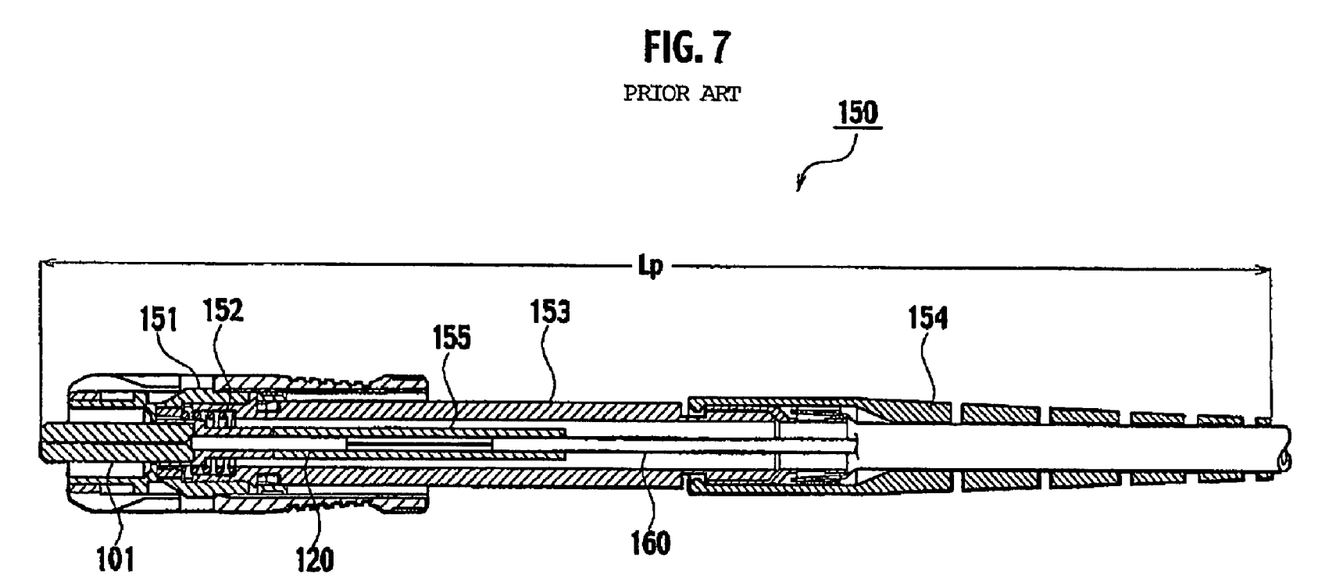
FIG. 7 is a cross-sectional view showing an example of an optical connector using the optical connector component shown in FIGS. 5 and 6.

FIG. 7 is a cross-sectional view of an optical connector 150 using the conventional optical connector component 101 shown in FIGS. 5 and 6. For comparison of the optical connector 150 with the optical connector 50 according to the present invention, the optical connector 150 includes the optical connector component 101 being stored and held in a plug housing 151, similarly to the optical connector 50, after a rear end of the short-length optical fiber 120 extending rearward of the optical connector component 101 is fusion-spliced to a tip end of the optical fiber 160, and a fusion-spliced portion is reinforced by a reinforcing member 155.

The comparison of the optical connector 150 with the optical connector 50 indicates the following respect. The optical-axis-direction length of the optical connector component 101 is longer than that of the optical connector component 1. Due to this, a stop ring 153 is formed longer than the stop ring 53 by a length corresponding to the difference between the lengths of the optical connector component 101 and the optical connector component 1. As a result, an entire length Lp of the optical connector 150 is longer than an entire length Li of the optical connector 50 (Li<<Lp).

Meanwhile, it is necessary to perform operations for fusion-splicing the short-length optical fiber 20 of even the optical connector component 1 (see FIGS. 1 and 2) shorter in optical-axis-direction length than the conventional optical connector component 101 to the optical fiber 60, reinforcing the fusion-spliced portion, and storing in the plug housing 51 at the actual site. Due to this, as compared with an ordinary optical connector that is not required to be subjected to the splicing operation and the like, it is unavoidable that the entire length of the optical connector 50 is longer than that of the ordinary optical connector.

It is assumed that the entire length of the optical connector 50 according to the present invention (the optical connector using the optical connector component 1 according to the present invention) falls within a comparable range to that of the optical connector that is not required to perform the splicing operation and the like, it is expected that an applicable area of the present invention can be greatly enlarged.

Considering these respects, optical connectors of five types in entire length Li (see FIG. 3), i.e., 95 mm, 90 mm, 85 mm, 80 mm, and 69 mm are produced by assembling the optical connector 50 shown in FIG. 3 using several types of stop rings 53 elongated or shortened.

Figure 8A:
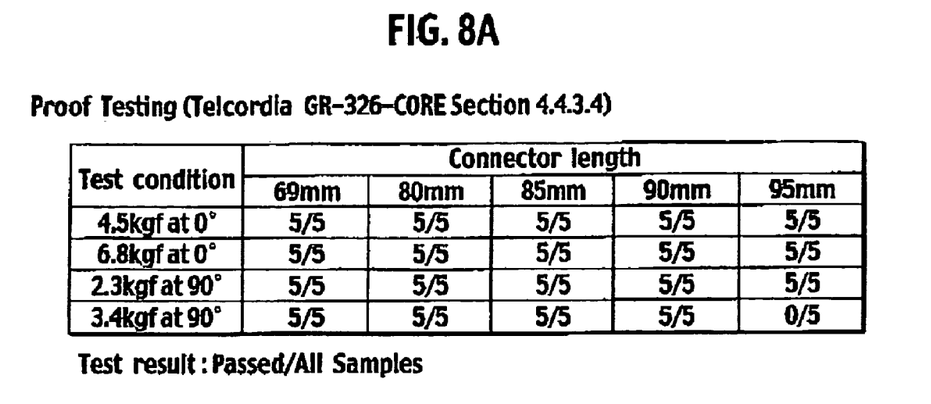
FIGS. 8A to 8C are tables showing an example of optical connector mechanical tests.
Figure 8B:
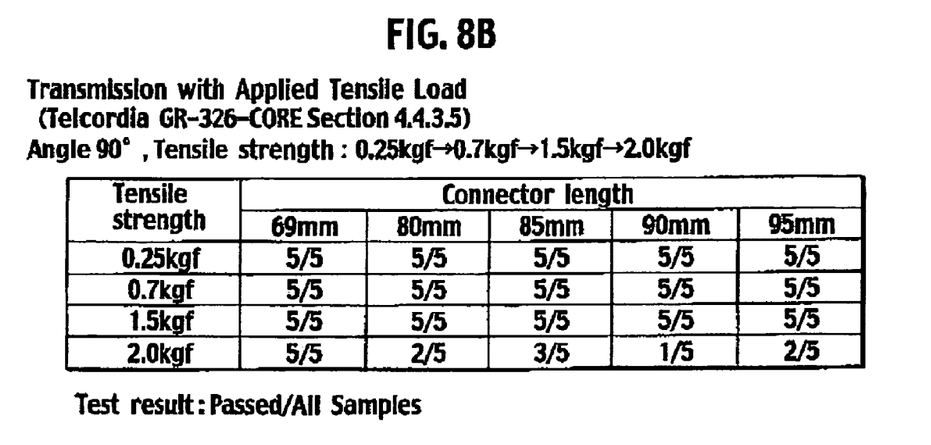
Figure 8C:
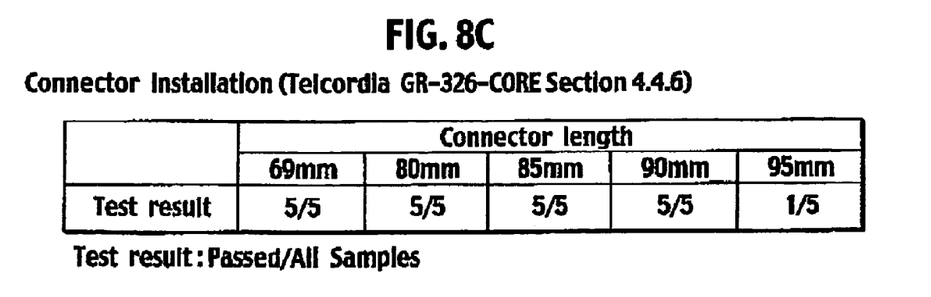

Using the five optical connectors of the different lengths as samples, mechanical tests were conducted by Telcordia GR-326-CORE. FIGS. 8A to 8C show one example of results of the mechanical tests.

As evident from the test results shown in FIGS. 8A to 8C, when the connector length is 95 mm, some samples did not pass in each of the tests shown in FIGS. 8A to 8C.

On the other hand, when the connector length is not longer than 90 mm, all the samples passed the tests shown in FIGS. 8A and 8C. However, some samples did not pass when a tensile strength is 2.0 kgf in the test shown in FIG. 8B. When the tensile strength is not higher than 1.5 kgf, all the samples passed the test shown in FIG. 8B.

Further, when the connector length is not longer than 69 mm, all the samples passed in all the tests shown in FIGS. 8A to 8C.

These test results indicate the following respect. When the tensile strength is not higher than 1.5 kgf as a usage environment, it is possible to obtain an optical connector having sufficient mechanical performance to resist actual usage by setting the connector length to be not longer than 90 mm.

Furthermore, when the connector length is set to be not longer than 70 mm, it is possible to obtain the optical connector having sufficient mechanical performance to resist a severe usage environment in which the tensile strength is 2.0 kgf.

According to the present invention, it is possible to easily perform the fusion-splicing operation for the fusion-spliced optical connector at an actual site in a short time, without need to perform special operations.

What is claimed is:

1. An optical connector component comprising:
a ferrule including a capillary and a flange holding a rear end of the capillary; and
a short-length optical fiber, attached to the ferrule, having a bare optical fiber portion formed on a tip end of the short-length optical fiber and a splice portion formed on a rear end of the short-length optical fiber to be fusion-spliced to a tip end of an optical fiber, any coating around the bare optical fiber portion being removed, wherein
the capillary comprises a minute through hole and a coated-portion storage hole formed from a tip end to the rear end in the capillary, the minute through hole storing therein the bare optical fiber portion of the short-length optical fiber and the coated-portion storage hole storing therein a part of a coated optical fiber portion of the short-length optical fiber continuous to the bare optical fiber portion,
the flange including an end wall immediately adjacent to the rear end of the capillary and having no extension extending rearward from the end wall, a peripheral wall extending from the end wall and circumferentially around the rear end of the capillary, and a coated-portion penetrating hole formed in the end wall to be penetrated therein a very short portion continuous to the part of the coated optical fiber portion stored in the coated-portion storage hole, and
the short-length optical fiber extending rearward from the coated-portion penetrating hole of the flange and becoming exposed to an extra length required for the splice portion when the bare optical fiber portion is fixedly stored in the minute through hole of the capillary and the part of the coated optical fiber portion continuous to the bare optical fiber portion is fixedly stored in the coated-portion storage hole of the capillary.

2. The optical connector component according to claim 1, wherein the minute through hole and the coated-portion storage hole are formed in the capillary so that the minute hole is shorter than the coated-portion storage through hole.

3. The optical connector component according to claim 2, wherein the extra-length splice portion extending rearward from the flange has at least a length required by a splicing device splicing a rear end of the extra-length splice portion to a tip end of an optical fiber to which the rear end of the extra-length splice portion is optically spliced.

4. The optical connector component according to claim 3, wherein an outside diameter of the capillary is approximately 2.5 mm, and an entire optical-axis-direction length of the ferrule including the capillary and the flange is not longer than 12 mm.

5. The optical connector component according to claim 4, wherein an optical-axis-direction length of the minute through hole of the capillary is not shorter than 2 mm and not longer than 5 mm.

6. The optical connector component according to claim 5, wherein an optical-axis-direction length of the flange is not shorter than 3 mm and not longer than 4 mm.

7. An optical connector comprising:
an optical fiber, including an optical connector component attached to a tip end of the optical fiber, and a plug housing storing and holding the optical connector component therein, wherein
the optical connector component includes:
a ferrule including a capillary and a flange holding a rear end of the capillary; and
a short-length optical fiber, attached to the ferrule, having a bare optical fiber portion formed on a tip end of the short-length optical fiber and a splice portion formed on a rear end of the short-length optical fiber to be fusion-spliced to a tip end of an optical fiber, any coating around the bare optical fiber portion being removed, wherein
the capillary comprises a minute through hole and a coated-portion storage hole formed from a tip end to the rear end in the capillary, the minute through hole storing therein the bare optical fiber portion of the short-length optical fiber and the coated-portion storage hole storing therein a part of a coated optical fiber portion of the short-length optical fiber continuous to the bare optical fiber portion,
the flange including an end wall immediately adjacent to the rear end of the capillary and having no extension extending rearward from the end wall, a peripheral wall extending from the end wall and circumferentially around the rear end of the capillary, and a coated-portion penetrating hole formed in the end wall and to be penetrated therein a very short portion continuous to the part of the coated optical fiber portion stored in the coated-portion storage hole, and
the short-length optical fiber extends rearward from the coated-portion penetrating hole of the flange and becomes exposed by an extra length required for the splice portion when the bare optical fiber portion is fixedly stored in the minute through hole of the capillary and the part of the coated optical fiber portion continuous to the bare optical fiber portion is fixedly stored in the coated-portion storage hole of the capillary, and a fusion-spliced portion formed by fusion-splicing the splice portion of the short-length optical fiber to the tip end of the optical fiber, the fusion-spliced portion stored and held in a plug housing while a reinforcing member reinforces the fusion-spliced portion.

8. The optical connector according to claim 7, wherein the reinforcing member is a heat-shrinkable sleeve containing a metal and a thermoplastic resin and having an optical-axis-direction length not longer than 25 mm.

9. The optical connector according to claim 8, wherein the fusion splicing is performed after arranging that the rear end of the short-length optical fiber and the tip end of the optical fiber are opposed and aligned by referring to a position of cores or cladding portions.

10. The optical connector according to claim 9, wherein an entire length of the optical connector from a tip end of the ferrule to a rear end of a boot is not longer than 90 mm.

11. The optical connector according to claim 9, wherein an entire length of the optical connector from a tip end of the ferrule to a rear end of a boot is not longer than 70 mm.

12. The optical connector according to claim 7, wherein the minute through hole is shorter than the coated-portion storage hole;

the extra length of the splice portion extending rearward from the flange has at least a length required by a splicing device splicing the splice portion to the tip end of the optical fiber to which the splice portion is optically spliced;

the capillary has an outside diameter that is approximately 2.5 mm and the ferrule including the capillary and the flange has an entire optical-axis-direction length that is not longer than 12 mm;

the minute through hole of the capillary has an optical-axis-direction length that is not shorter than 2 mm and not longer than 5 mm;

the flange has an optical-axis direction length that is not shorter than 3 mm and not longer than 4 mm; and the reinforcing member has an optical-axis-direction length that is not longer than 25 mm, whereby the fusion spliced portion is stored and held in the plug housing and the optical connector has an entire length from the tip end of the ferrule to a rear end of a boot that is not longer than 90 mm.

13. The optical connector according to claim 12, wherein the entire length of the optical connector is not longer than 70 mm.

14. The optical connector according to claim 12, wherein the reinforcing member is a heat-shrinkable sleeve containing a metal and a thermoplastic resin.

15. The optical connector according to claim 12, wherein the fusion-splicing is performed after aligning the splice portion of the short length optical fiber and the tip end of the optical fiber relative to a position of cores or cladding portions of the splice portion of the short length optical fiber and the tip end of the optical fiber.

16. The optical connector component according to claim 1, further comprising:

a tapered portion formed in a boundary portion between the minute through hole and the coated-portion storage hole, the tapered portion diametrically expanding toward the coated-portion storage hole so that an end of the coated optical fiber portion adjacent to the bare optical fiber portion comes in contact with the tapered portion; and the coated-portion penetrating hole of the flange configured to support the very short portion continuous to the part of the coated optical fiber portion.

17. The optical connector according to claim 7, further comprising:

a tapered portion formed in a boundary portion between the minute through hole and the coated-portion storage hole, the tapered portion diametrically expanding toward the coated portion storage hole so that an end of the coated optical fiber portion adjacent to the bare optical fiber portion comes in contact with the tapered portion; and the coated portion penetrating hole of the flange configured to support the very short portion continuous to the part of the coated optical fiber portion.

18. The optical connector component according to claim 16, wherein the coated-portion storage hole of the capillary has an optical-axis-direction length which is longer than that of the minute through hole and that of coated portion penetrating hole of the flange.

19. The optical connector according to claim 17, wherein the coated-portion storage hole of the capillary has an optical-axis-direction length which is longer than that of the minute through hole and that of coated portion penetrating hole of the flange.

* * * * *

UNITED STATES PATENT AND TRADEMARK OFFICE
CERTIFICATE OF CORRECTION

PATENT NO. : 7,507,031 B2 Page 1 of 1
APPLICATION NO. : 11/834124
DATED : March 24, 2009
INVENTOR(S) : Kawasaki It is certified that error appears in the above-identified patent and that said Letters Patent is hereby corrected as shown below:

ASSIGNEE:

Change "Chiga" to "Chiba"

IN THE CLAIMS:

Claim 2, Column 8, Line 12: Add "through" between "minute" and "hole"

Claim 2, Column 8, Line 13: Delete "through"

Signed and Sealed this

Thirtieth Day of June, 2009

JOHN DOLL
*Acting Director of the United States Patent and Trademark Office*